(12) United States Patent
Brown et al.

(10) Patent No.: US 7,810,401 B2
(45) Date of Patent: Oct. 12, 2010

(54) APPARATUS AND METHOD FOR OPERATION IN THE LAMINAR, TRANSITION, AND TURBULENT FLOW REGIMES

(75) Inventors: Gregor J. Brown, Scotland (GB); Donald R. Augenstein, Pittsburgh, PA (US); Herbert Estrada, Annapolis, MD (US)

(73) Assignee: Cameron International Corporation, Houston, TX (US)

( * ) Notice: Subject to any disclaimer, the term of this patent is extended or adjusted under 35 U.S.C. 154(b) by 10 days.

(21) Appl. No.: 12/074,843

(22) Filed: Mar. 7, 2008

(65) Prior Publication Data

US 2009/0223306 A1 Sep. 10, 2009

(51) Int. Cl.
*G01F 1/44* (2006.01)
(52) U.S. Cl. .................................. 73/861.63
(58) Field of Classification Search ............. None
See application file for complete search history.

(56) References Cited

U.S. PATENT DOCUMENTS

| | | | | |
|---|---|---|---|---|
| 3,686,946 A | * | 8/1972 | Halmi | 73/861.64 |
| 3,788,140 A | * | 1/1974 | Turtle | 73/861.28 |
| 6,330,831 B1 | * | 12/2001 | Lynnworth et al. | 73/861.28 |
| 6,647,806 B1 | * | 11/2003 | Estrada et al. | 73/861.28 |
| 6,895,825 B1 | * | 5/2005 | Barkhoudarian | 73/861.28 |
| 2008/0072686 A1 | * | 3/2008 | Hoecker | 73/861.22 |
| 2008/0072688 A1 | * | 3/2008 | Hoecker | 73/861.64 |

* cited by examiner

*Primary Examiner*—Harshad Patel
(74) *Attorney, Agent, or Firm*—Ansel M. Schwartz

(57) ABSTRACT

An apparatus for determining fluid flow in a pipe apparatus includes a fluid nozzle in contact with the pipe having a contour without negative pressure gradients along the nozzle's surface as fluid flows through the nozzle. The apparatus includes a transit time ultrasonic flow meter employing at least one acoustic path in communication with the fluid in the pipe and disposed downstream of the nozzle. An apparatus for determining fluid flow in a pipe. The apparatus includes a fluid nozzle in contact with the pipe having a contour defined by a compound cubic. The present invention includes a transit time ultrasonic flow meter employing at least one acoustic path in communication with the fluid in the pipe and disposed downstream of the nozzle. A fluid nozzle for a pipe. A method for determining fluid flow in a pipe.

15 Claims, 2 Drawing Sheets

APPARATUS AND METHOD FOR OPERATION IN THE LAMINAR, TRANSITION, AND TURBULENT FLOW REGIMES

FIELD OF THE INVENTION

The present invention is related to an apparatus for determining fluid flow in a pipe. (As used herein, references to the "present invention" or "invention" relate to exemplary embodiments and not necessarily to every embodiment encompassed by the appended claims.) By way of example, the present invention provides a fluid nozzle that is in fluid communication with the pipe and that has a contour selected to avoid fluid separation while organizing the velocity profile. More specifically, the present invention is related to measurement apparatus for determining fluid flow in a pipe. The exemplary measurement apparatus incorporates a nozzle with an inner-surface contour defined by a compound cubic body of revolution or alternatively a compound of two ellipsoidal bodies of revolution, and has a transit time ultrasonic flow meter.

BACKGROUND OF THE INVENTION

This section is intended to introduce the reader to various aspects of the art that may be related to various aspects of the present invention. The following discussion is intended to provide information to facilitate a better understanding of the present invention. Accordingly, it should be understood that statements in the following discussion are to be read in this light, and not as admissions of prior art.

The petroleum industry typically employs turbine and ultrasonic meters, for example, to measure flow rate and other fluid characteristics. The accuracy of such meters generally depends on the continuity and stability of the axial fluid velocity profiles to which they are subjected. Spatially discontinuous profiles or profiles that vary widely in time lead to unpredictable and hence unacceptable variations in the calibrations of such meters, for instance.

The axial velocity profile associated with a flowing fluid in a fully closed conduit, like a pipe, depends on the relative magnitudes of the forces acting on the fluid, which can be generally classified as either inertial forces or frictional forces. The inertial forces tend to keep fluid particles moving at a constant velocity in a constant direction, while the frictional forces between adjacent flow streams, characterized by the fluid viscosity, tend to slow the fluid down. In some instances, fluid viscosity may slow the flow rate to zero at the pipe wall. The ratio of the inertial forces to the viscous forces, which is known as the Reynolds number and is dimensionless, is often used in fluid dynamics to characterize velocity profiles.

In many industrial applications the inertial forces dominate. In such cases, the Reynolds number exceeds 5000 and the fluid flow is characterized as "turbulent". The momentum of parallel flow streams is freely exchanged by small, random eddies; and the profile, while varying only to a small degree both spatially and temporally, is, on average, blunt, stable, and readily and accurately measured by both turbine meters and ultrasonic meters. However, in recent years, applications have required the measurement of the flows of very heavy crude oils, where Reynolds numbers are in the 500 to 5000 range and where viscous forces play an important role in determining the character of the profile. At Reynolds numbers below about 1000, the flow regime is characterized as "laminar"; in long straight pipes the velocity profile approaches a parabolic shape, but in any case, it is extremely stable and without eddies. Temperature gradients can create measurement problems in this regime but, with an isothermal product, flow measurement with ultrasonic instruments presents no insuperable problems. The use of turbine meters in this regime is more problematic however, because of the interaction of the turbine itself with the flowing fluid.

At Reynolds numbers above 1000 but below 5000, the flow regime is characterized as "transitional". In this range, the flow may tend to be laminar, but small disturbances in fluid velocity, in the topography of the pipe wall, or the physical configuration of the measurement instruments themselves may trigger large vortices accompanied by sudden and dramatic changes in axial profile. Reference texts describe transitional flow as being like laminar flow that is interspersed with turbulent 'puffs' and 'slugs', the existence and frequency of which are dependent on the Reynolds number and other characteristics of the pipe (geometry, vibration, etc.). The time-averaged velocity profile before the puff or slug is essentially the same as a laminar profile, and in the center of the puff or slug it is essentially the same as a turbulent profile. At the leading and trailing edges of the puff or slug the profile changes from one shape to the other, and this change is accompanied by the generation of large eddies.

Neither turbine meters nor ultrasonic meters have performed acceptably in the transition region, their calibrations being too difficult to establish and too variable to be used in petroleum applications requiring accuracy, such as custody transfer and product allocation. At the present time the only instruments suited for use in the transition region are positive displacement meters, which are expensive and require frequent maintenance. The present invention provides a technique whereby ultrasonic meters may be made to operate stably and reliably in the transition region, without compromising their performance in the laminar regime below or in the turbulent regime above.

To the best of the inventors' knowledge, there is no prior application for the specific purpose measuring a velocity profile in the transition regime with an ultrasonic meter. Prior-art nozzles used for the measurement of mass flow—such as a so-called ASME nozzle—with differential pressure instruments have a bluff entry and are often characterized by a single ellipsoid as opposed to the compound cubic or compound ellipsoid used by the invention described herein. FIG. 5 illustrates a typical conventional flow nozzle profile.

BRIEF SUMMARY OF THE INVENTION

The present invention pertains to a method and an apparatus for determining fluid flow in a pipe that uses a fluid nozzle in conjunction with a transit time ultrasonic flow meter. The fluid nozzle has an inner surface of a desired contour to transition the fluid flow from the pipe to the meter for the meter to analyze the fluid flow.

BRIEF DESCRIPTION OF THE SEVERAL VIEWS OF THE DRAWING

In the accompanying drawings, the preferred embodiment of the invention and preferred methods of practicing the invention are illustrated in which.

DETAILED DESCRIPTION OF THE INVENTION

Figure 1:
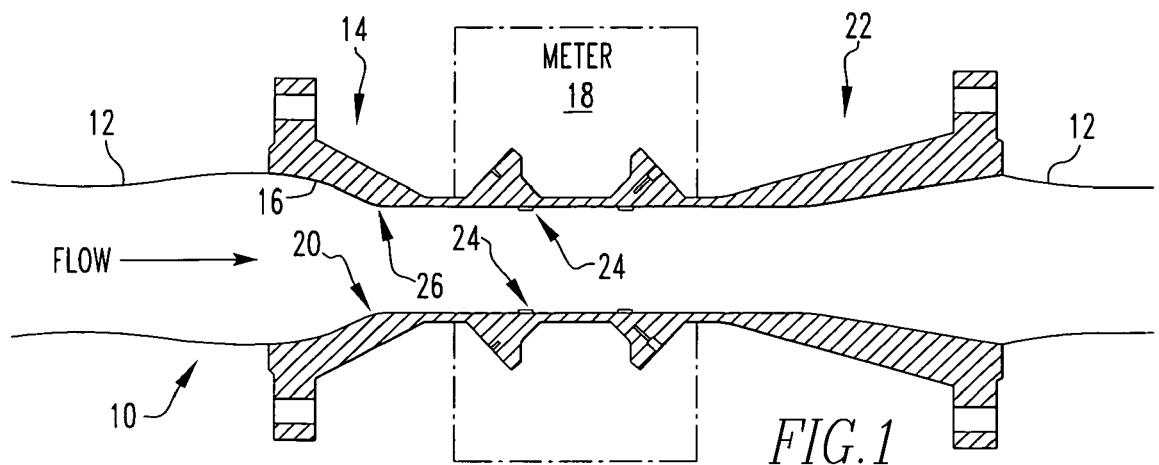
FIG. 1 is a sectional, schematic view of an apparatus of the present invention.

Referring now to the drawings wherein like reference numerals refer to similar or identical parts throughout the several views, and more specifically to FIG. 1 thereof, there is shown an apparatus 10 for determining fluid flow in a pipe 12. The apparatus 10 comprises a fluid nozzle 14 in fluid communication with the pipe 12. The nozzle 14 has a surface 16 that is contoured to prevent negative pressure gradients resulting from fluid flow. The apparatus 10 comprises a transit-time ultrasonic flow meter 18 employing at least one acoustic path in communication with the fluid in the pipe 12 and disposed downstream of the nozzle 14. Put differently, the apparatus 10 provides a reduced-bore ultrasonic flow meter for measuring flow characteristics of a fluid within a pipe.

The fluid nozzle 14 generally comprises an annular interior surface having a concave-profile portion and a convex-profile portion. The concave-profile portion or the convex-profile portion or any combination thereof can be ellipsoidal, or cubic, or sinusoidal, for example. The convex concave-profile and convex-profile portions can be ellipsoidal, cubic or sinusoidal.

To prevent negative pressure gradients, the surface 16 of the nozzle 14 by way of example can be contoured as a compound ellipsoid. For example, this surface's contour can be described as a compound of two ellipsoidal bodies of revolution. The two ellipsoidal bodies of revolution are formed by the rotation of ellipses having the form $\{(X-X_0)^2/a^2+(Y-Y_0)^2/b^2=1\}$, where a and b are the equatorial radii (along the X and Y axes), and X, Y, $X_0$ and $Y_0$ are numbers in regard to their respective axes, as is discussed in detail further below.

A ratio of the diameter of the nozzle's 14 throat 20 to the diameter of the pipe 12 upstream of the nozzle 14 in one embodiment is 0.7 or less. More specifically, the ratio can be about 0.67. The nozzle 14 can have a length between ½ and 3 pipe 12 diameters. The upstream apertures 24 of the meter 18 can be disposed between ½ and 3 pipe diameters of the downstream end 26 of the nozzle 14.

The apparatus 10 can include a diffuser 22 in fluid communication with the pipe 12 at a location downstream from the flow meter 18. The flow meter 18 can measure fluid in the pipe 12 having a Reynolds number between 1000 and 5000.

The present invention pertains to a fluid nozzle 14 for a pipe 12. The nozzle 14 comprises an inner surface 16 having a contour which prevents negative pressure gradients in the fluid along the inner surface 16 as fluid flows through the nozzle 14. The nozzle 14 comprises a throat 20, wherein a ratio of the diameter of the throat 20 to the diameter of the pipe 12 upstream of the throat 20 is 0.7 or less.

The present invention pertains to a method for determining fluid flow in a pipe 12. The method comprises the steps of flowing fluid through a fluid nozzle 14 in contact with the pipe 12 having a contour defined by a compound cubic or ellipsoid. There is the step of measuring the fluid in the pipe 12 with a transit-time ultrasonic flow meter 18 employing at least one acoustic path in communication with the fluid in the pipe 12 and disposed downstream of the nozzle 14.

The flowing step can include the step of flowing fluid through the nozzle 14 where the contour is a compound of two ellipsoidal bodies of revolution. The flowing step can include the step of flowing fluid through the nozzle 14 where the two ellipsoidal bodies of revolution each have a form [ ]. The flowing step includes the step of flowing fluid through the nozzle 14 where a ratio of the diameter of the nozzle's 14 throat 20 to the diameter of the pipe 12 upstream of the nozzle 14 is 0.7 or less. The flowing step includes the step of flowing fluid through the nozzle 14 where the ratio is about 0.67. The flowing step can include the step of flowing the fluid having a Reynolds number between 1000 and 5000 through the fluid nozzle 14. There can be the step of flowing the fluid through a diffuser 22 in contact with the pipe 12 downstream from the flow meter 18.

In the operation of the invention, the apparatus 10 makes use of the inertial forces created by a reducing nozzle 14 having specified characteristics to control a flow field that would otherwise be chaotic. The chaos arises when the flow is in a transition region where neither the viscous forces, which control the velocity profile at lower velocities and higher viscosities, nor the inertial forces, which control the velocity profile at higher velocities and lower viscosities, are dominant. Stabilization of the velocity profile in the transition region is important to the satisfactory operation of transit-time ultrasonic meters 18 in the transition region. Stabilization permits the calibration (meter factor) of the ultrasonic meter 18 to be established with precision and made reproducible, thereby allowing it to be used for accurate flow measurements for applications in which the flow field characteristics have hitherto been discouraged.

The apparatus 10 consists of a reducing nozzle 14 and a transit-time ultrasonic flow meter employing one or more acoustic paths. The meter 18 calculates fluid velocity from the transit times of pulses of ultrasonic energy traveling with and against the direction of fluid flow. The volumetric flow is determined from the velocity measurement(s). In the sectional drawing of the invention, FIG. 1, the meter 18 employs eight acoustic paths arranged chordally, which allows the four individual axial velocity measurements to be integrated numerically without error from transverse velocity components, thereby facilitating a volumetric flow measurement of greater accuracy than would be the case with, for example, a single acoustic path. Nevertheless, as noted previously, the invention applies to transit time ultrasonic flow meters employing as few as one acoustic path. This configuration employs a 0.63-beta-ratio reducing nozzle and a conical diffuser for recovery of pressure losses. (A beta ratio is the ratio of the nozzle 14 diameter at the outlet to that at the inlet.)

Figure 2:
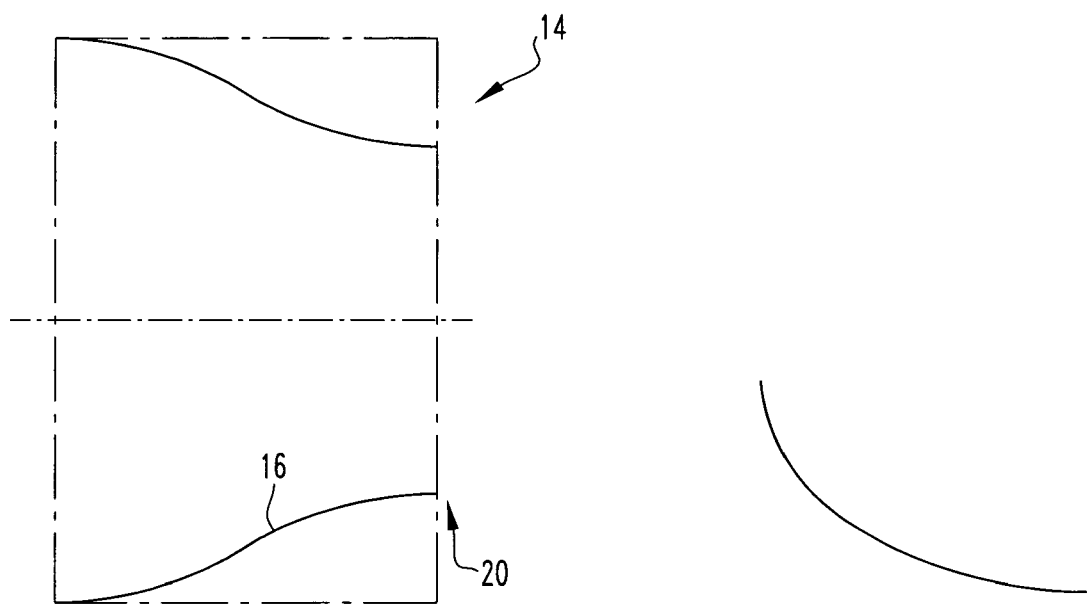
FIG. 2 is a compound ellipsoidal profile of a reducing nozzle.
Figure 5:
FIG. 5 is a typical flow nozzle profile of the prior art for flow measurement by differential pressure.

FIG. 2 shows, in profile, the contour of the flow nozzle 14 used in the invention. The contour is a compound of two ellipsoids each having the form $\{(X-X_0)^2/a^2+(Y-Y_0)^2/b^2=1\}$, where a and b are the equatorial radii (along the X and Y axes), and X, Y, $X_0$ and $Y_0$ are numbers in regard to their respective axes. Flow enters from the left. The ellipsoid contours of the surface 16 avoid negative pressure gradients within the flow along the surface 16. Avoiding negative gradients is beneficial because it prevents against induced boundary layer separation and, hence, turbulence. In FIG. 2, the ratio of the nozzle 14 diameter at the outlet to that at the inlet (the so-called beta or β ratio) is 0.67. This ratio produces an average axial velocity in the throat 20 equal to $(1/\beta^2)$ or about 2.2 times the average axial velocity in the pipe 12. The inertial force on the fluid in the throat 20 is related to the axial velocity squared and is therefore roughly five times greater than that in the pipe 12. [The viscous forces are also increased, because of the smaller internal diameter; but the overall inertial to viscous force ratio is increased in the nozzle 14 throat 20 by roughly 1.5.]

The choice of the nozzle 14 β ratio is governed by two countervailing considerations:

Experience with flow nozzles 14 used for the measurement of mass flow, which devices measure the differential pressure between an upstream tap and a tap in the throat 20, has shown that lower β ratios lead to more repeatable performance (See for example the ASME publication *Fluid Meters*). The calibrations of nozzles 14 having β ratios larger than 0.75 have sometimes lacked repeatability.

The constructability and cost effectiveness of ultrasonic meters 18 diminishes with their diameter. Few such meters 18 smaller than 4 inches in diameter are offered for sale. Hence, the lowest practical p ratio for a 6 inch line carrying heavy oil is probably around 0.67.

The nozzle 14 in the reduced-bore meter 18 not only increases the velocity, but also flattens the axial velocity profile, whether the flow is laminar, turbulent or transitional. This flattening of the profile means that the turbulent and laminar profiles are more alike and hence reduces the variation in profile in the transition region. In addition, the increase in axial velocity is achieved without an accompanying increase in the eddy velocity, and hence diminishes the impact of the eddies. The flattening of the profile is a benefit that is obtained with a relatively abrupt contraction—an extremely long contraction would presumably increase the velocity/inertial forces without significantly flattening the profile.

Figure 3:
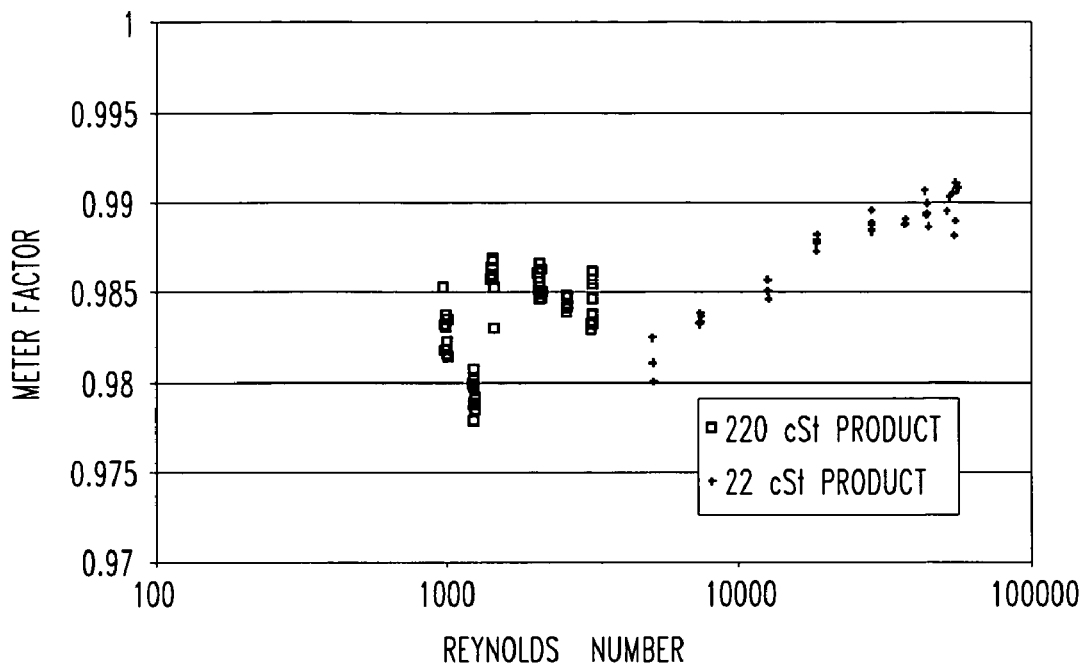
FIG. 3 is a graph of full-bore meter linearity in laminar, transition, and turbulent regimes to Reynolds number of 100,000.
Figure 4:
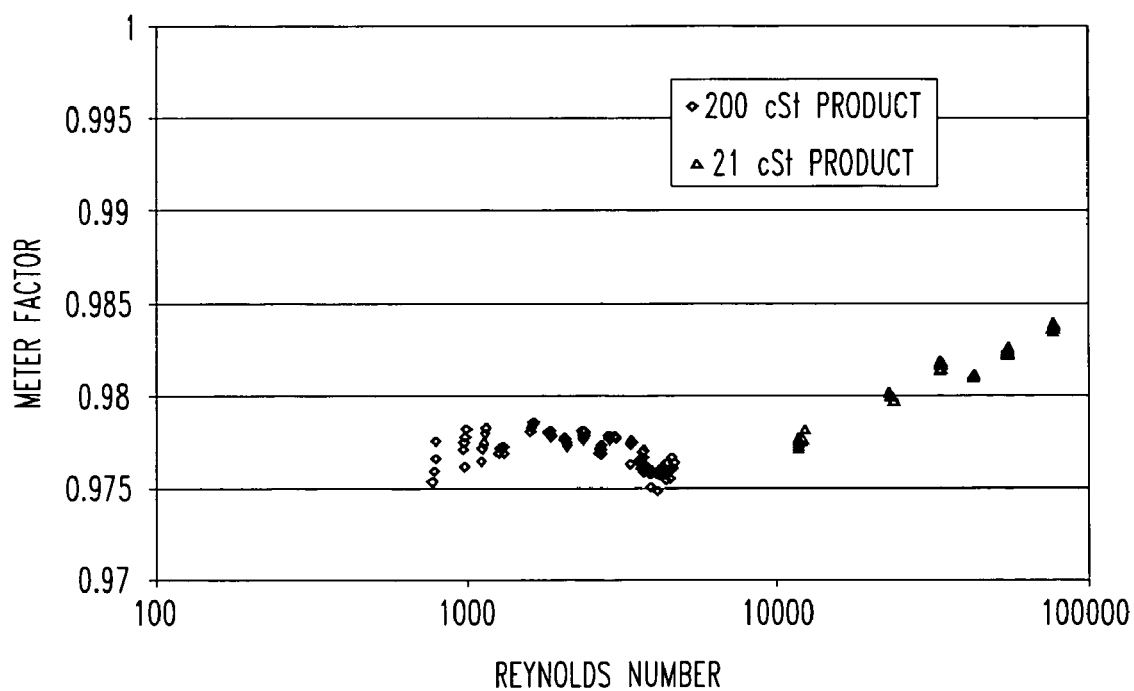
FIG. 4 is a graph of a reduced-bore (6×4) meter linearity in laminar, transition, and turbulent regimes to Reynolds number of 100,000 of the present invention.

FIGS. 3 and 4 provide experimental evidence of the improvement to the linearity and repeatability of ultrasonic meters 18 brought about by this invention. FIG. 3 plots calibration data for a conventional 6 inch 4 path ultrasonic meter 18 (where the internal diameter of the pipe 12 is constant through the meter 18 and no diameter reducing nozzle is employed) against the Reynolds number of the fluid in that pipe. As shown in the figure, to achieve Reynolds numbers spanning the laminar to the fully turbulent range—1000 to 100,000—two fluids of different viscosities were necessary for the calibration process. The lower Reynolds number regime was covered by a fluid having a kinematic viscosity of about 220 centiStokes, the higher regime by a fluid having a kinematic viscosity of about 20 centiStokes. It will be seen from FIG. 3 that above the transition region (which typically lies in a Reynolds number range of 2000 to 5000—depending on installation specifics such as pipe 12 smoothness and steadiness of flow, the transition may take place at Reynolds numbers as low as 1500 or as high as 7000) the meter 18 factor data are tightly clustered and readily correlated with Reynolds number. But below this region, they span a range of nearly 1%, with no obvious correlation with Reynolds number or any other variable. This characteristic renders the 6 inch through-bore meter 18 not useful for custody transfer operations in the transition region-below Reynolds numbers of about 5000.

FIG. 4 shows the benefits of this invention. As in FIG. 3, it plots the meter factor of a meter 18 in a 6 inch line against the Reynolds number of the fluid in the line, but the data are obtained from a meter 18 similar to that of FIG. 1: a 4 inch four path meter 18 is located downstream of a 6 inch by 4 inch reducing nozzle 14 with the nozzle 14 profile conforming with the contour of FIG. 2 and a head recovery expansion cone downstream, as in FIG. 1. In the turbulent region above a Reynolds number of 5000, the calibration data of the through bore meter 18 of FIG. 3 and the reduced bore meter 18 of FIG. 4 are similar, a gradually increasing meter 18 factor with Reynolds number. The calibrations of both meters 18 can readily be linearized—the meter 18 factor made constant over a wide range of Reynolds numbers—by applying an incremental correction to the raw meter 18 factor based on Reynolds number. The Reynolds number can be determined from measurements, by the meter 18, of product sound velocity and temperature, or by other means.

In the transition region—at Reynolds numbers below 5000 and above 1000—however, the characteristics of the meters 18 of FIGS. 3 and 4 differ dramatically. As noted above, the calibration data for the through bore meter 18 of FIG. 3 are confused and uncorrelated; the calibration of this meter 18 in the transition region would be too uncertain for custody transfer or other high value applications in this region. The calibration data of the reduced bore meter 18 of FIG. 4, on the other hand, are tightly clustered and nearly constant over the 1000 to 5000 range of Reynolds numbers. The meter 18 calibration in this region is readily characterized; the meter 18 factor is 0.9770+0.15%, performance that is quite consistent with its use for custody transfer and other high accuracy applications in the transition region. FIG. 1 is a sectional view of a reduced bore ultrasonic meter 18. This configuration employs a 0.63 beta ratio reducing nozzle 14 and a conical diffuser 22 for recovery of pressure losses with an 8 path chordal meter 18. FIG. 2 is a compound ellipsoidal profile of the reducing nozzle 14. For this nozzle 14, a 0.67 beta ratio is employed. Flow enters from the left.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

The invention claimed is:

1. An apparatus for determining fluid flow in a pipe, the apparatus comprising:
    a fluid nozzle in fluid communication with the pipe and having a surface with a contour, the contour is substantially defined by a compound of two ellipsoidal bodies of revolution to prevent negative pressure gradients in the fluid along the nozzle's surface as the fluid flows through the nozzle; and
    a transit time ultrasonic flow meter disposed downstream of the nozzle and employing at least one acoustic path in communication with the fluid in the pipe.

2. An apparatus for determining fluid flow in a pipe, the apparatus comprising:
    a fluid nozzle in contact with the pipe and having a contour substantially defined by a compound of two ellipsoidal bodies of revolution; and
    a transit-time ultrasonic flow meter disposed downstream of the nozzle and employing at least one acoustic path in communication with the fluid in the pipe.

3. An apparatus as described in Claim 2 wherein the two ellipsoidal bodies of revolution are formed by the rotation of ellipses having the form $\{(X-X_0)^2/a^2+(Y-Y_0)^2/b^2=1\}$, where a and b are the equatorial radii (along the X and Y axes), and $X, Y, X_0$ and $Y_0$ are numbers in regard to their respective axes.

4. An apparatus as described in claim 3 wherein a ratio of the diameter of the nozzle's throat to the diameter of the pipe upstream of the nozzle is 0.7 or less.

5. An apparatus as described in claim 4 wherein the ratio is about 0.67.

6. An apparatus as described in claim 5 including a diffuser in fluid communication with the pipe downstream from the flow meter.

7. An apparatus as described in claim 6 wherein the flow meter is configured to measure fluid in the pipe having a Reynolds number between 1000 and 5000.

8. An apparatus as described in claim 7 wherein the nozzle has a length between ½ and 3 pipe diameters.

9. An apparatus as described in claim 8 wherein the flow meter has upstream apertures that are disposed between ½ and 3 pipe diameters from the downstream end of the nozzle.

10. A method for determining fluid flow in a pipe comprising the steps of:
 flowing fluid through a fluid nozzle in fluid communication with the pipe having a contour defined by a compound of two ellipsoidal bodies of revolution; and
 measuring the fluid in the pipe with a transit-time ultrasonic flow meter employing at least one acoustic path in communication with the fluid in the pipe and disposed downstream of the nozzle.

11. A method as described in claim 10 wherein the flowing step includes the step of flowing fluid through the nozzle where the two ellipsoidal bodies of revolution each have a form $\{(X-X_0)_2/a^2+(Y-Y_0)^2/b^2=1\}$, where a and b are the equatorial radii (along the X and Y axes), and X, Y, $X_0$ and $Y_0$ are numbers in regard to their respective axes.

12. A method as described in claim 11 wherein the flowing step includes the step of flowing fluid through the nozzle where a ratio of the diameter of the nozzle's throat to the diameter of the pipe upstream of the nozzle is 0.7 or less.

13. A method as described in claim 12 wherein the flowing step includes the step of flowing fluid through the nozzle where the ratio is about 0.67.

14. A method as described in claim 13 including the step of flowing the fluid through a diffuser in fluid communication with the pipe downstream from the flow meter.

15. A method as described in claim 14 wherein the flowing step includes the step of flowing the fluid having a Reynolds number between 1000 and 5000 through the fluid nozzle.

\* \* \* \* \*